Nov. 25, 1958 E. C. CURTIS 2,861,480
TORQUE CONVERTER AND GEAR TRANSMISSION DRIVE
Filed Sept. 17, 1953 6 Sheets-Sheet 3

INVENTOR.
EVERETT C. CURTIS
BY
RICHEY, WATTS, EDGERTON & McNENNY
A. H. Edgerton
ATTORNEYS Nov. 25, 1958 E. C. CURTIS 2,861,480
TORQUE CONVERTER AND GEAR TRANSMISSION DRIVE
Filed Sept. 17, 1953 6 Sheets-Sheet 4
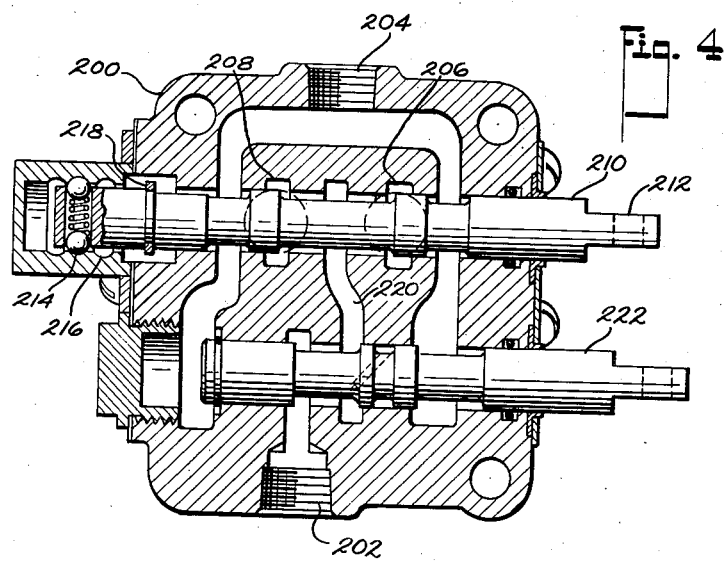
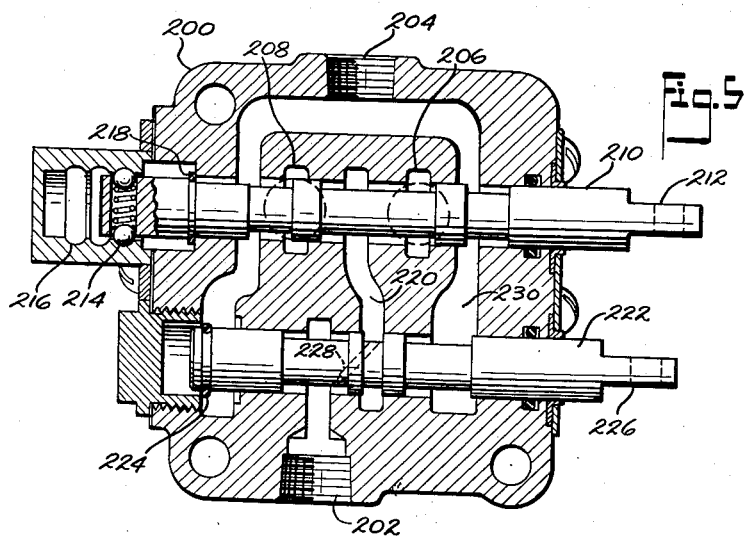
INVENTOR.
EVERETT C. CURTIS
BY
RICHEY, WATTS, EDGERTON & McNENNY
ATTORNEYS

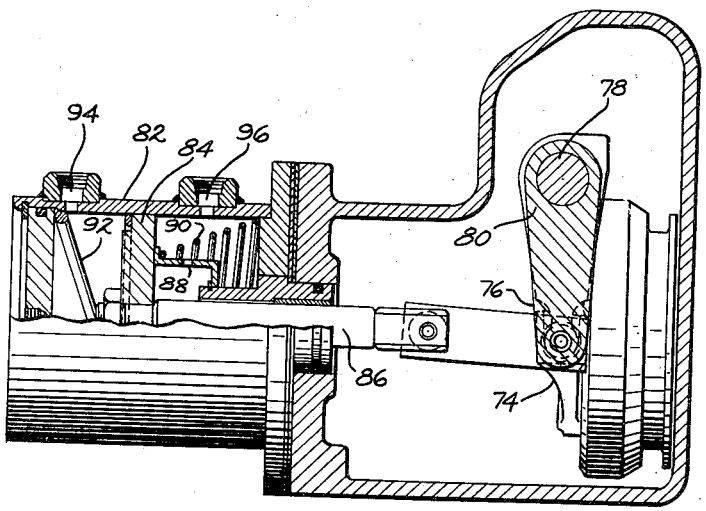
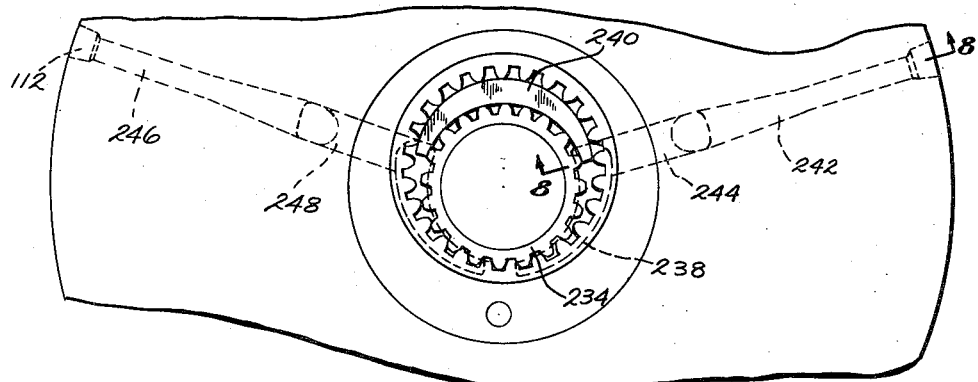
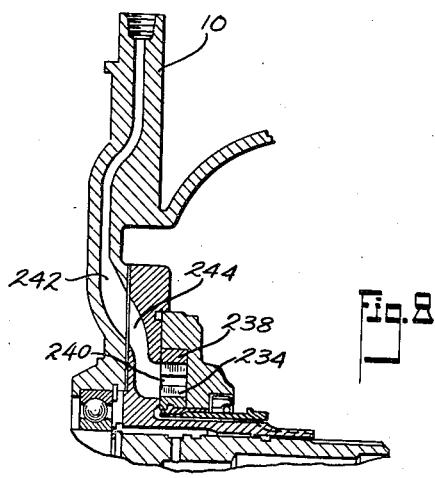
INVENTOR.
EVERETT C. CURTIS
BY
RICHEY, WATTS, EDGERTON & McNENNY
ATTORNEYS Nov. 25, 1958
E. C. CURTIS
2,861,480
TORQUE CONVERTER AND GEAR TRANSMISSION DRIVE
Filed Sept. 17, 1953
6 Sheets-Sheet 6
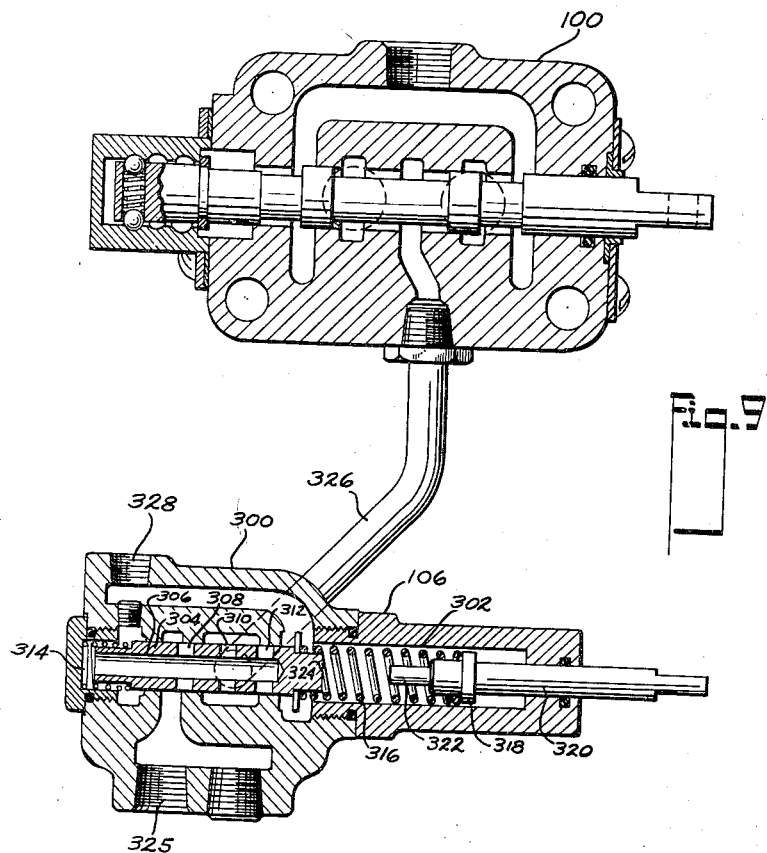
INVENTOR.
EVERETT C. CURTIS
BY
RICHEY, WATTS, EDGERTON & McNENNY
*A. H. Edgerton*
ATTORNEYS United States Patent Office 2,861,480
Patented Nov. 25, 1958

2,861,480

TORQUE CONVERTER AND GEAR TRANSMISSION DRIVE

Everett C. Curtis, Cleveland, Ohio, assignor to Towmotor Corporation, Cleveland, Ohio, a corporation of Ohio Application September 17, 1953, Serial No. 380,734

6 Claims. (Cl. 74—732)

This invention relates to transmissions utilizing a torque converter input and more particularly to a hydraulic control system for determining the direction of travel and the speed of movement of the vehicle in which the transmission is mounted. The preferred embodiment of this invention finds usefulness as a drive for a lift truck. The problems of driving a lift truck are well known and include the provision of an adequate means of starting, stopping, and reversing the vehicle hundreds of times during a working day and for adequately controlling the speed of the vehicle movement as the load is being lifted.

The ordinary dry plate clutch is used extensively in lift trucks but the life thereof is short which means that it must be replaced regularly, and this results in high maintenance costs. To overcome this problem and eliminate the need for taking the vehicle out of service, the present transmission was developed, utilizing the torque converter or hydraulic type of clutch for facilitating the shifting, starting, stopping, and reversing of the vehicle.

To provide for slowly moving the vehicle while the lift mechanism is in operation, a control for the transmission has been provided, which makes the truck more adaptable and useful for a stacking operation, as an example. The slow speed control allows the truck to creep forwardly or rearwardly while the engine is operating at high speed for lifting a load in the regular manner. The elements of the transmission which accomplish this result are aranged to provide the maximum in durability and life so that the cost of maintenance of the vehicle and the time out of service is held to a minimum. Therefore, the most important object of this invention is to provide a transmission mechanism which will allow sensitive control of the vehicle at low speeds while operating the lifting mechanism at a normal speed.

Another object of this invention is to provide a hydraulic control mechanism operable by the regular clutch pedal for stopping and starting and controlling the speed of the vehicle.

Another object of this invention is to provide clutch apparatus for alternately engaging the forward and reverse gears thus eliminating shifting of the gears.

A still further object of this invention is to utilize a portion of the oil which circulates through the torque converter to cool the clutch mechanism utilized in the shifting operation.

Another object of this invention is to provide a hydraulic control valve capable of controlling the pressure applied to the clutch facings, thereby limiting the driving force obtained therefrom.

Another object of this invention is to provide control apparatus for locking the brakes on the vehicle when the drive is disconnected.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 4 is a sectional view of the direction and creep control valve.

Fig. 5 is a sectional view of the direction and creep control valve.

Fig. 6 is a fragmentary detail view of the hydraulic cylinder and linkage.

Fig. 7 is a view taken immediately to the rear of the torque converter section looking forward.

Fig. 8 is a sectional view taken along line 8—8 in Fig. 7.

Fig. 9 is a sectional view of a modified form of direction and creep control valves.

Figure 1:
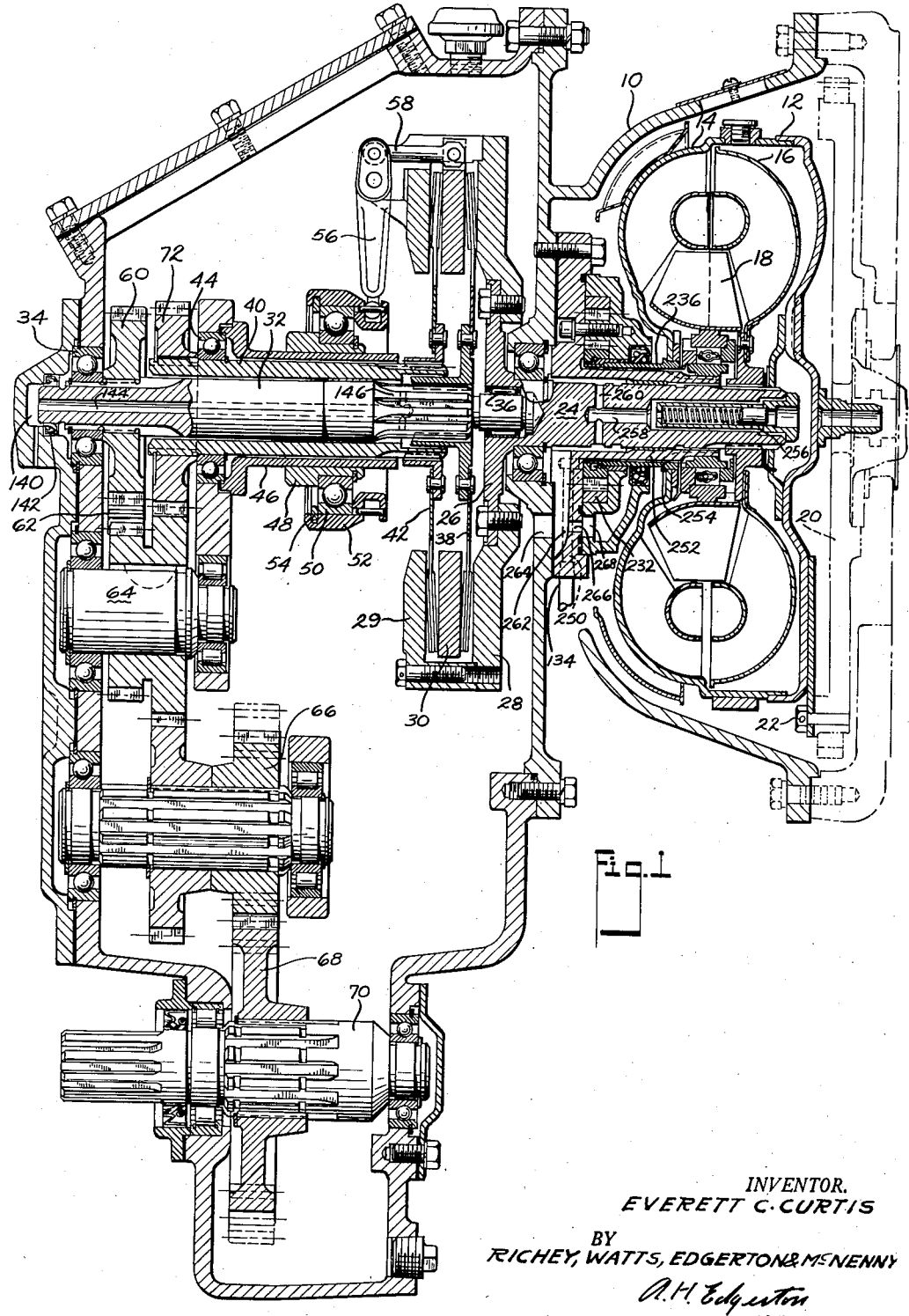
Fig. 1 is a cross-sectional view of the transmission taken along a vertical plane intersecting the axis of rotation of the torque converter.

Referring first to Fig. 1, the preferred embodiment of my invention is shown therein, having the transmission mechanism mounted in a housing 10. A torque converter 12 is rotatably mounted therein, the torque converter 12 having the usual pump 14, turbine 16, and reaction member 18. The pump 14 is driven by the engine flywheel 20 and affixed thereto by a plurality of bolts 22 located near the periphery of the flywheel 20.

The turbine 16 is mounted on the shaft 24 which extends through the torque converter unit and into the gearing section of the transmission. A flange 26 is formed on the end thereof for carrying the clutch elements. A pair of spaced-apart rings 28 with parallel faces in a plane perpendicular to their axis of rotation are mounted on the flange 26. A clamping ring 30 is located between the rings 28 and is shiftable toward each of the rings 28 by the control mechanism and acts as a pressure plate. A shaft 32 located on the centerline of the torque converter is rotatably mounted in a bearing 34 carried by the housing 10 and a bearing 36 carried by the flange 26. A clutch plate assembly 38 is mounted on the shaft 32 and extends between the clamping ring 30 and the rearward ring 28. As the clamping ring 30 moves to the right (Fig. 1), the clutch plate 38 is clamped against the ring 28, thus forming a driving connection from the torque converter to the shaft 32. In the present embodiment, this represents the forward drive of the vehicle. A sleeve 40 is rotatably mounted around the shaft 32 and has a second clutch plate 42 mounted on the right-hand end thereof; the friction surfaces of the plate being located between the clamping ring 30 and the rear ring 29. As the clamping ring 30 moves toward the ring 29, a driving connection is made between the torque converter and the sleeve 40. The end of the sleeve opposite to the clutch plate 42 is journalled in a bearing 44 which is mounted in an extension of the transmission housing 10. A shifter support sleeve 46 is carried by the housing 10 and surrounds the sleeve 40. A carrier 48 is slidably mounted thereon and carries a thrust bearing 50. A shifting ring 52 is mounted on said bearing and held in place by a retainer ring 54. The shifting ring 52 rotates with the clutch mechanism and actuates a plurality of arms 56 pivotally mounted on the ring 28. Links 58 connect the arms 56 with the clamping ring 30 for moving the clamping ring 30 into engagement with the clutch plates as the carrier 48 is moved laterally along the sleeve 46.

A forward gear 60 is mounted on the end of the shaft 32 adjacent the housing 10. Gear 60 drives an idler gear 62, and idler gear assembly 64, a second idler gear assembly 66, and a drive gear 68 mounted on the drive shaft 70 rotatably mounted in the housing and extending rearwardly therefrom. The reverse gear 72 mounted on sleeve 40 drives the idler assembly 64, the second idler assembly 66, and the drive gear 68. Since the idler gear 62 is included in the forward gear train and is not included in the reverse gear train, it is obvious that the direction of rotation of shaft 70 is opposite when the connection to the gear trains is changed.

Figure 2:
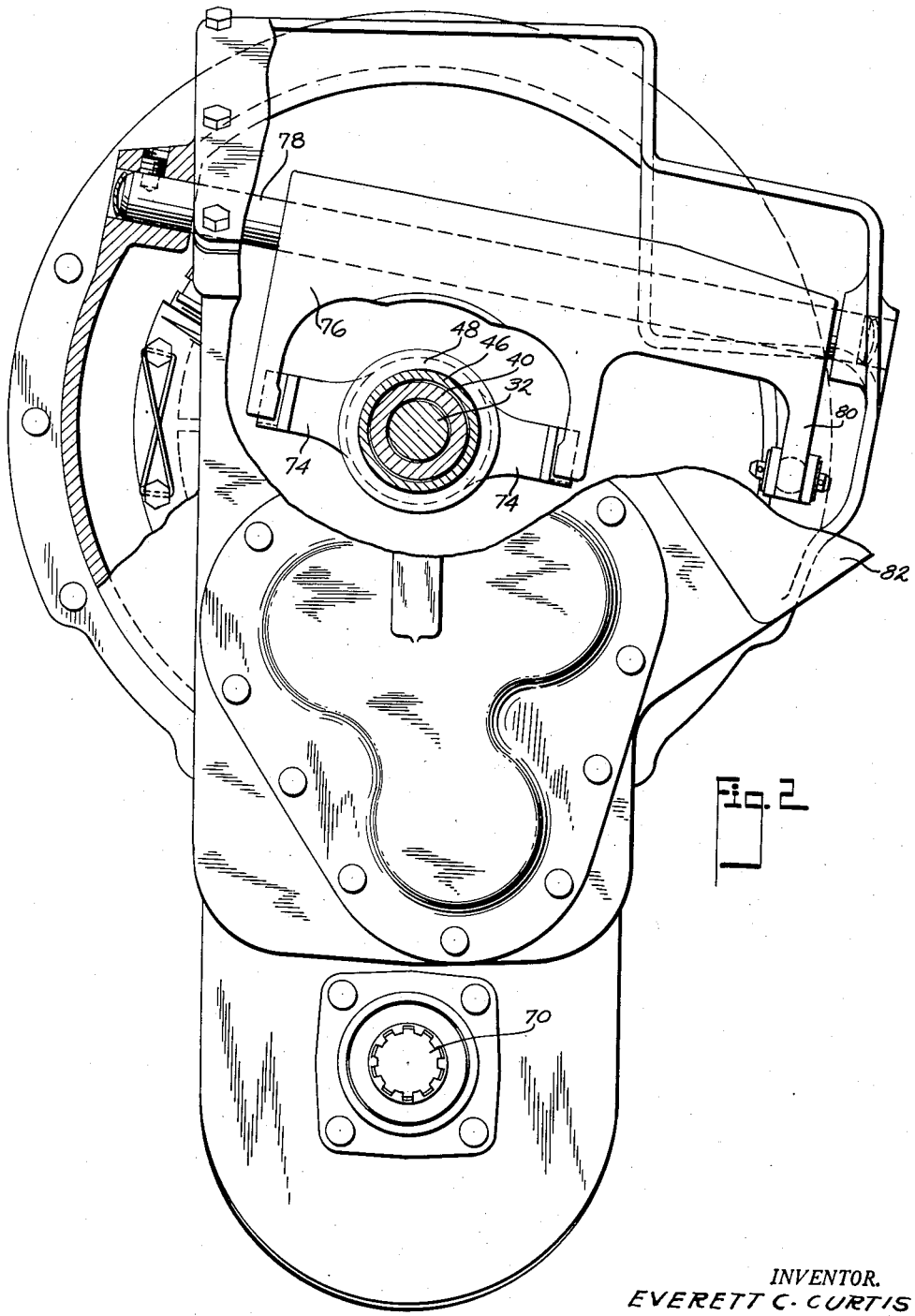
Fig. 2 is an end view of the transmission with parts cut away to show details of construction.

The mechanism for operating the carrier 48 is shown in Figs. 2 and 6, the carrier 48 having projecting arms 74. A yoke 76 pivotally engages the arms 74 to actuate the carrier along the sleeve 46. The yoke 76 is rotatably mounted in the housing 10 on a shaft 78. An arm 80 on the yoke 76 is connected to a hydraulic motor 82 located on the outside of the housing 10; the morce developed by the hydraulic motor being transmitted to the clutching mechanism through the arm 80 of the yoke 76.

It will be observed that the operative result of the clutch and gearing arrangement above described causes the clutch discs 38 and 42, when rotated, to be turned in opposite directions. For example, when the disc 38 is gripped to effect forward the drive of the vehicle, the disc 42 rotates in a direction opposite the directional rotation of disc 38. When the disc 42 is gripped to effect reverse drive of the vehicle, the disc 38 rotates in a direction opposite the rotational direction of the disc 42. A number of operating advantages result from this arrangement. When the vehicle is moving slowly forward the engine may be accelerated to lift a heavy load and at the same time the forward speed of the vehicle may be retarded by relasing the clutch plate 38 and partially engaging the clutch plate 42. It will be understood that direction of the vehicle motion will not be reversed until after the disc 42 has stopped turning in a direction opposite to the rotation of the engine.

The hydraulic cylinder 82 is arranged to actuate both of the clutches 38 and 42, however, the provision of a single cylinder eliminates the possibility of engagement of both clutches simulataneously. If two operators were used or other mechanisms of similar nature, any malfunction of the control mechanism could lock both clutches and cause extensive damage to the transmission. However, with the preferred embodiment disclosed herein, it is impossible to damage the transmission if faulty operation should occur.

In the cylinder 82, a piston 84 is mounted on the piston rod 86 and is positioned intermediate the ends of the cylinder when the clutches are in the neutral position. A stop 88 movable from the center position to one end position is urged to the center position by a spring 90. A second spring 92 on the opposite side of the piston to the spring 90 urges the piston against the stop 88. The spring 92 is somewhat weaker than the spring 90, which allows the stop 88 to function to locate the piston at the center of its stroke when there is no fluid pressure tending to actuate the piston 84 in one or the other of its directions of travel.

A port 94 is provided in the cylinder for receiving oil under pressure to actuate the piston 84 in a direction which locks the reversing clutch 42 and a similar port 96 receives the hydraulic fluid under pressure, which actuates the clutch 38 for the forward drive. By controlling the pressure of the fluid to a reduced value, the force applied to the pressure plate of the clutch may be held at a reduced value, thus allowing the clutch to slip and providing a driving force at a reduced speed from that of the engine. When the fluid under pressure is removed from the cylinder the piston always returns to a neutral position, thus disengaging both of the clutches.

*Hydraulic control system*

Figure 3:
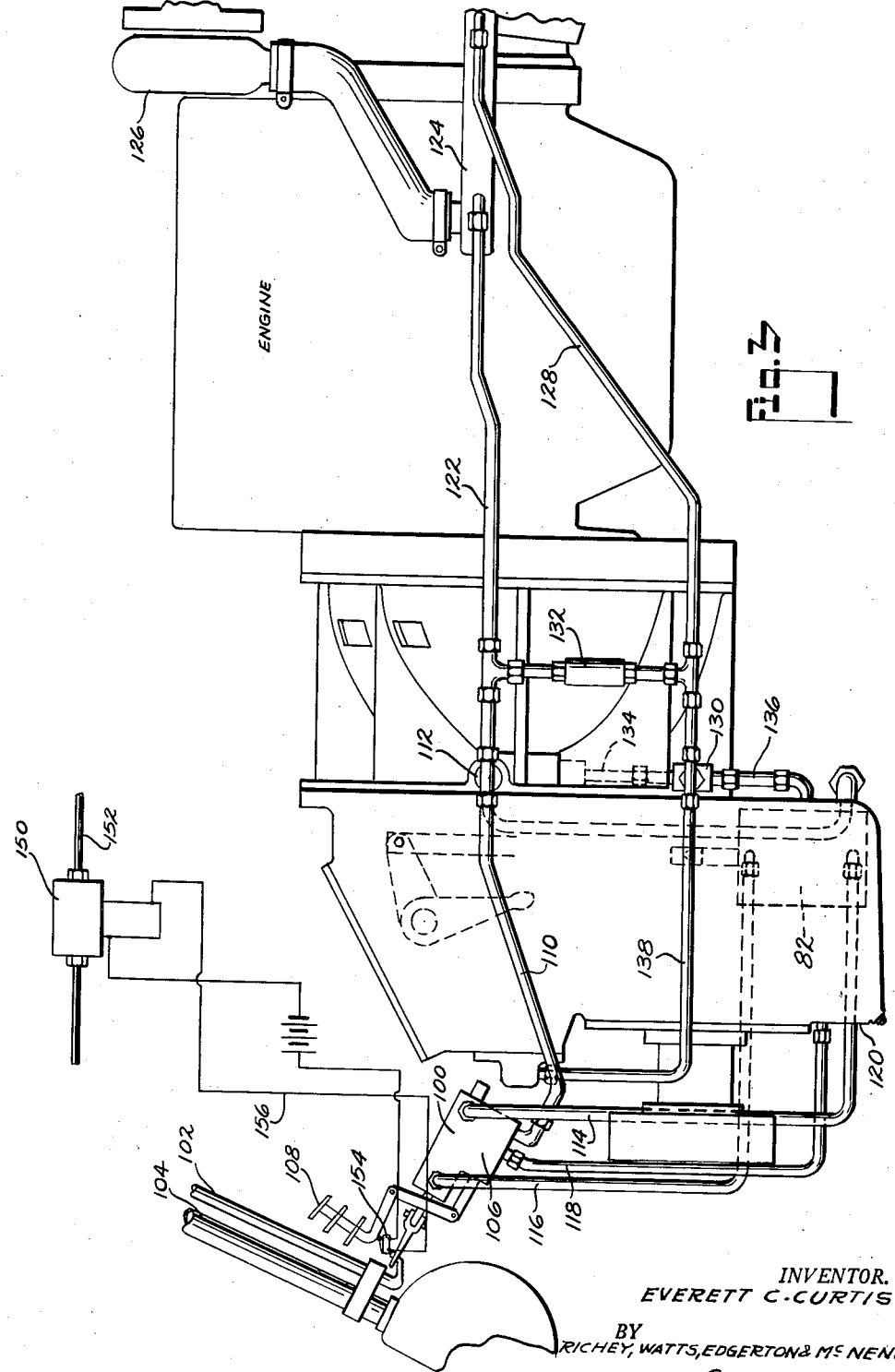
Fig. 3 is a schematic diagram showing the relationship of the hydraulic system to the lift truck, certain parts being reversed for purposes of clarity.

The transmission mechanism above described is controlled by valving connected with the conventional control elements found on a lift truck. As shown in Fig. 3, a directional control valve 100 is positioned beneath the floorboard of the vehicle and connected to the directional control lever shaft 102 adjacent the steering wheel 104 of the vehicle. A second valve 106, which may be included in the same casing with the directional control valve 100, functions to determine the creep speed of the vehicle. The creep control valve 106 is the the 3-position type and is connected through linkage to a creep control pedal 108 in the position of the customary clutch pedal found on gasoline-driven lift trucks. The normal operating position of the clutch pedal 108 with the truck in motion is at the outermost end of its path of travel. The neutral position of the creep control pedal 108 is at the floorboard when the vehicle is not in motion. At an intermediate position of the creep control pedal 108 the control valve 106 operates to cause the vehicle to move slowly in either a forward or reverse direction as determined by the directional control assembly.

To provide oil under pressure for operating the control mechanism, a line 110 between the oil connection 112 and the creep control valve 106 is provided. The oil passes through the valve as determined by the position of the creep control pedal 106 hereinafter described, and thence to the directional control valve 100. An oil line 114 connects the directional control valve 100 and one end of the clutch control cylinder 82 which actuates the clutch mechanism to reverse the vehicle. A second line 116 connects the directional control valve 100 to the opposite end of the cylinder 82 and when fluid under pressure is conducted therethrough, the clutch mechanism is operated, to cause the vehicle to move in a forward direction. A return line 118 connects the creep control valve 106 to the sump portion 120 of the transmission housing 10. Oil is supplied to the pump through line 121 which runs from the sump 120 to the pump inlet passage 242.

A cooling system for the hydraulic torque converter and the clutches includes a pressure line 122 from the pump 112 to a heat exchanger 124. The heat exchanger 124 has passages for the hydraulic oil supply and for the engine coolant, which is forced through the engine radiator and the heat exchanger 124 by the engine coolant pump 126. The cooled oil is conducted through a line 128 to a relief valve 130, preset to maintain a constant pressure at the torque converter. A by-pass valve 132 is arranged to short-circuit the heat exchanger when the oil is cold or if flow through the heat exchanger were to be stopped, thus preventing possible starving of the torque converter and clutches. An oil line 134 connects the relief valve to the torque converter unit. A return line 136 conducts the oil from the relief valve to the sump 120 in the event the relief valve opens.

The cooling oil for the clutch mechanism is conducted through a line 138 joined to the transmission housing 10 at the end of shaft 32. The line 138 is restricted to maintain a flow of approximately one gallon per minute and normal pressures in the oil system. A cavity 140 surrounds the end of the shaft 32 and is maintained against leakage by a seal 142 between the shaft 32 and the housing 10. An axial bore 144 in the shaft 32 extends from the cavity 140 to ports 146 formed by cross-drilling the shaft at a point immediately beyond the end of the sleeve 40 on which the clutch plate 42 is mounted. Oil passing through the system including the bore 44 and the ports 146 is discharged between the clutch plates 38 and 42 and thrown on the friction surfaces, thus cooling them and dissipating the heat generated by the slipping thereof during the creep operation.

As a part of the control apparatus for regulating the travel of the vehicle, a normally open solenoid valve 150 is placed in the supply line 152 running from the master cylinder of the hydraulic brake system to the brake cylinders (not shown). A switch 154 is located adjacent the creep control pedal in such a manner that the circuit 156 is closed when the pedal is in the position where the clutches are disengaged. Accordingly, when the pedal is pushed to the floor and held in that position, the brakes will be locked if they have been previously applied by operation of the brake pedal. This allows the operator to remove his foot from the brake pedal to operate the accelerator pedal without the vehicle coasting either forward or backward when it is stopped on a slope. When the creep pedal is all the way down, the engine is completely disengaged from the transmission and the vehicle is free to roll. The provision of the brake control makes possible the more effective use of the creep control system associated therewith.

*Control valves*

The directional control valve 100 and the creep control valve 106 are located in a single body 200 as shown in Fig. 4, for convenience in manufacturing and making the installation and connections thereto on the vehicle. The pressure supply line 110 from the pump is connected to the valve at a port 202. The return line 118 which conducts the oil from the cylinder 82 to the sump 120 is connected to the valve at a port 204.

The oil line 116 which conducts the oil from the valve to the cylinder 82 for actuating the clutches for forward movement is connected to the valve at a port 206 and the line 114 for reversing movement is connected to the valve at a port 208. The directional control portion of the valve has a plunger 210 which is slidable in the valve and has three operating positions. At the end of the plunger opposite to the linkage connection 212, a pair of spring-pressed balls 214 are mounted thereon and engage three annular grooves 216 which hold the plunger in the particular operating position to which it has been moved. The plunger is limited in its travel by a snapring 218 which engages the valve body at each end of its path of travel. In Fig. 4 the plunger 210 is shown in the central position in which location the oil under pressure is vented to each of the ports 206 and 208. In this position the piston of the hydraulic cylinder 82 would be held in a central location and neither of the clutches 38 and 42 would be engaged. Oil under pressure is supplied to the directional control portion of the valve through the passage 220 and movement of the plunger 210 to the left as shown in Fig. 4 would prevent the passage of oil to the port 206 and would allow the passage of oil to the port 208. At this condition the clutch causing the reverse movement of the vehicle would be engaged. A movement of the plunger 210 to the extreme right position as shown in Fig. 5 would prevent the oil pressure from reaching port 208 and would allow oil to flow through port 206, thus causing the clutch 38 to be engaged and the vehicle to move in a forward direction.

The creep control portion of the valve has a plunger 222 slidable in the valve body 200 for controlling the pressure and quantity of oil entering the passage 220 and thence to the clutch operating cylinder 82. A snapring 224 is mounted on the end of the plunger 222 to delimit the movement thereof. A linkage connection 226 is made externally on the valve body 200 for connection to the pedal 108. The plunger is arranged to allow full flow and pressure of the oil supplied through port 202 to reach the passage 220 for discharge to the clutch cylinder 82 as determined by the position of the directional control plunger 210 when it is in the extreme right position as shown in Fig. 4. A movement of the pedal 108 to an intermediate position moves the plunger to the position shown in Fig. 5 in which one end of the restricted passage 228 is open to the port 202 and the other end is opened to the passage 220. In this position the hydraulic fluid is allowed to flow at a low rate into the clutch actuating cylinder 82, thus applying the clutch pressure gradually and with a reduced force. After a period of time, sufficient oil will pass through the restriction to build up the pressure in the cylinder and the clutch will be completely engaged.

Continued movement of the plunger 222 to the extreme left which would result from pushing the pedal 108 to the floorboard would close the passage of oil from the port 202 to the passage 220 and vent the passage 220 to the passage 230 connected to the port 204, thus allowing the oil to return from the cylinder to the sump and the piston in the cylinder 82 to return to a neutral position. By positioning the pedal alternately between the closed and creep positions, pressure on the clutch actuating cylinder may be maintained at a low value, thus causing the vehicle to move at a slow speed or inch, as required by the particular function which is being accomplished by the machine.

The oil pressure system for the controls and clutch cooling is supplied from a pump 232 driven by the engine crankshaft, and located on the center line of the torque converter, as shown in Fig. 1. The pump 232 is of the type having a gear 234 driven by a sleeve 236 connecting to the torque converter pump. A second gear 238 of larger diameter and having internal teeth engages gear 234, the two gears being separated by a crescent boss 240. Oil being supplied to the pump 232 is conducted through a passage formed in the torque converter housing 10 and through a passage 244 formed in the collector ring of the pump 232. Similar passages 246 in the housing and 248 in the collector ring are provided for conducting the oil under pressure to the outside of the housing 10 where it terminates in the oil connection 112.

Oil under pressure is conducted to the torque converter assembly by a line 134 from the pressure system as shown in Fig. 3 and is connected to a drilled passage 250 in the housing 10. From the passage 250 the oil flows through clearance space between the reaction member support sleeve 252 and the pump drive sleeve 254 and reaches the torque converter housing through space adjacent the reaction member free-wheeling unit. The oil circulates therethrough and returns by way of the pressure relief valve 256 located in the passage formed in the turbine shaft 24. The relief valve 256 is spring loaded to maintain a constant pressure in the torque converter housing and maintain a uniform flow of oil at all times. From the relief valve 256, the oil passes through a passage 258, a cross-drilled passage 260, and through a space between the shaft 24 and the reaction member support sleeve 252. A passage 262 formed in the collector ring conducts the oil through a port 264 to the sump portion of the housing 10. Drilled ports 266 and 268 drain the oil which may leak from the pump through the passage 262 and the port 264. Oil pressure build-up on the seals is prevented thereby. This oil circuit maintains a constant change of oil through the torque converter unit, thus eliminating overheating of the device.

An alternate form of creep control valving is shown in Fig. 9. Directional control valve 100 and the creep control valve 106 are in separate bodies rather than a single body as shown in Fig. 4. The directional control valve 100 is similar to the upper section of the valve shown in Fig. 4, the same parts having the same numbers. It is noted that in Fig. 9 the valve is shown in the position for reversing the vehicle, in which case the valve member 210 is moved all the way inwardly to provide fluid pressure to the port 94 in cylinder 82.

The modified creep control valve differs from the above described creep control valve in that the pressure supplied to the clutch actuating cylinder is regulated by the valve at a pressure determined by the position of the creep control pedal. The valve 106 has a body 300 in which a longitudinal bore 302 is formed for slidably carrying the valve mechanism. A valve member 304 has an axial bore 306 formed therein with cross-drilled passages 308, 310 and 312 intersecting therewith. A spring 314 engages one end of the valve member 304, and biases the valve member 304 toward a second and stronger spring 316. One end of the spring 316 engages the valve member 304 and the opposite end engages a shoulder 318 on the control rod 320. Motion in the control rod 320 towards the valve member 304 compresses the spring 316 and the spring 314, thus moving the valve member toward the left (see Fig. 9). When the spring 316 is partially compressed as shown in Fig. 9 and passage 308 is opened to fluid pressure from the port 325, the passage 312 is out of register with the return passage leading to ports 328 and thus fluid pressure is available to line 326 through passage 310. At the same time, fluid pressure extends through the bore 306 to the cavity surrounding the spring 314 and thus acts against the full transverse area of the valve member 304 to urge said valve member to the right as shown in Fig. 9. The axial force thus provided co-operates with the restoring force of the spring 314 to overcome the force of the spring 316 and thus move the valve member 304 to the right until the passage 308 is cut off from communication with the port 325. If the creep pedal position corresponding to this condition of the valve is maintained, no additional fluid flow or pressure will be supplied to the cylinder 82 and thus the clutch mechanism will be held in a given attitude for the desired clutch slippage. However, when the pedal is released somewhat to provide additional creeping of the truck, the spring 316 is further compressed urging the valve member to the left and opening the passage 308 to provide fluid flow and pressure to further operate the clutch until the increase in pressure causes the passage 308 to again close. Conversely, if the pedal were to be depressed further allowing the spring 316 to extend and reduce its force, the valve member would move to the right venting some of the fluid trapped in the cylinder until the pressure dropped enough to prevent the venting passage 312 to close. Thus the pressure in the cylinder 82 in the corresponding force on the clutch discs is controlled strictly by the creep pedal and is directly proportional to the pedal position. Furthermore, should leakage occur past the valve member 304 tending to decrease the clutch force effected by a given pedal position, the force will be restored and be maintained by the member 304 to the left until passage 308 has opened sufficiently to replace the lost fluid pressure. This automatic action serves also to nullify the effects of wear between the valve member 304 and the bore in which the valve member 304 moves. When the control rod 320 has compressed the spring 316 a pin end 322 engages the end 324 on the valve member 304 and positively controls the movement of said valve member. It can be seen that the valve member 304 is positioned by the pressure acting against the force of the spring 316 as applied by the position of the control rod 320. At this condition the valve member 304 is free to move to adjust the flow of oil to maintain the pressure called for. However, when the control rod engages the valve member 304 without benefit of the spring, the positioning of the valve member is controlled directly and is not affected by the variations in pressure. The high pressure oil supply is connected to the valve at a port 324 and when the valve is positioned as shown in Fig. 9 the oil may enter passage 308 to the passage 306 through the passage 310 and thence through the connecting line 326 to the directional control valve 100. This condition arises when the creep control pedal is in a mid position and it is desired to slip the clutch to obtain a low vehicle speed. When the creep control pedal 108 is released to the drive position, the pin 322 engages the end 324 of the valve member 304, moving it to the position where port 308 is fully open to the pressure inlet 324. To disengage the clutches and stop the vehicle, the creep control pedal 108 is moved downwardly, which actuates control rod 320 and relieves the compression in the spring 316. The spring 314 acting between the body and the end of valve member 304 urges the valve member into a position where port 308 is cut off from the pressure supply and port 312 is connected to the oil line rather than port 328. With this condition the oil may return from the cylinder 82 through the directional control valve 100, the connecting line 326, the ports 310, 306, 312, 328, to the return line 118. When the oil pressure is relieved by this method the clutches are completely disengaged.

A wide range of creep effort may be obtained by varying the creep control rod between the extreme positions and thus obtaining pressures entering line 326 in the range from zero to maximum supply pressure. The operator therefore has control of the creep torque required to produce the necessary clutch pressure to move the vehicle as required by the load condition which may be from an empty truck to a maximum-loaded truck. This action is accomplished by balancing the pressure at the open end of the plunger 304 plus the force of spring 314 against the spring 316, the force of spring 316 being variable due to the ability to position the rod 320. When the rod 320 is near the end of its stroke to the left, pressure from spring 314 is high, and pressure entering bore 306 must be high to displace the plunger 304 to the right to close off port 308. On the other hand, when rod 320 is slightly displaced to the left from its outermost position, the pressure on spring 316 is light and therefore the pressure of spring 314 plus the pressure on the end of the plunger 304 must be light, since port 308 would close as plunger 304 is urged to the right under this low pressure. The left end of plunger 304 is always open to pressure reaction from the oil in line 326 through port 310 and bore 306, while the right hand end of plunger 304 is subject only to pressure in the drain line by virtue of its cored passage to port 328 connected to the transmission sump which operates at atmospheric pressure.

It is noted that with the modified creep valve the clutch may be slipped continuously as long as the creep control pedal is maintained in the slip position. In the valve shown in Fig. 4 when the creep pedal is held in the creep position the oil pressure bleeds through the orifice and builds up to a clutch locking condition. To continue the clutch slipping it is necessary for the operator to move the pedal to discharge the oil in the cylinder and begin the cycle again by returning the pedal to the creep position and allowing the oil pressure to build up slowly through the orifice. Both modes of operation have advantages, depending on the service demand under which the vehicle is operated.

In operation a lift truck embodying the invention disclosed herein is particularly adapted for stacking articles and for running the elevating mechanism at maximum speed while the vehicle is moving at a low speed. Transmissions with selective gear ratios have been found inadequate under some conditions and the operator of the lift truck resorts to slipping the clutch to obtain adequate control of the vehicle at low speeds of travel. In some instances the clutch has been slipped continuously for long periods of time which not only causes undue wear but overheats the parts and produces other damage to the vehicles. The control means herein disclosed as the preferred embodiment of this invention prevents such continuous slipping of the clutch and further, the clutches are lubricated and cooled by the oil system, thereby improving the durability characteristics and reducing maintenance costs.

When the clutch control pedal is depressed the gearing is disconnected from the engine by the valve 106 relieving the oil pressure in the hydraulic cylinder 82 which actuates the clutch mechanism. The directional control valve may then be positioned by actuating the directional control lever shaft 102 to select the direction desired. The clutch control pedal is then released to a mid position which actuates the valve 106 to the creep position in which the hydraulic fluid under pressure is allowed to flow through a restriction to the hydraulic cylinder 82. The pressure in the system is built up gradually and the clutch therefore is engaged gradually, the vehicle begins to move at a low speed with gradual acceleration. If the clutch is held in the mid position or fully released, the pressure in the cylinder 82 will build up to a full value which will lock the selected clutch completely.

To obtain continuous creeping, the clutch pedal is in the mid position momentarily and then depressed to dump the oil in the cylinder 82 relieving pressure therein, and is then returned to the mid position or creep-producing location. This operation may be continued and it takes the form of "pumping" the pedal to obtain the continuous clutch slippage.

To reverse the vehicle, the clutch control pedal is depressed and the directional control valve is repositioned to obtain the reverse travel, whereupon release of the clutch control pedal will allow the hydraulic controls to cause engagement of the clutch mechanism and the vehicle will move in the opposite direction.

As an alternate mode of operation, the vehicle may be reversed without actuating the clutch control pedal. By repositioning the directional control valve, the clutch which was engaged is immediately released by venting the oil to the sump and the other clutch is engaged by the oil pressure supplied through the directional control valve. The direction of the vehicle can be reversed almost instantaneously by this procedure, and the time and effort necessary for the pedal operation is eliminated.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. In a lift truck having an engine, a fluid coupling and a transmission axially arranged in the sequence named, said transmission including forward drive and reverse drive gears to establish forward and reverse drive of the truck, a closed hydraulic system including a hydraulic pump driven by said engine, a clutch pressure plate assembly driven by said fluid coupling, a clutch disc operably connected to said forward drive gear disposed within said clutch pressure plate assembly, a clutch disc operably connected to said reverse driving gear disposed within said clutch pressure plate assembly, a movable pressure plate carried by said pressure plate assembly adapted to be moved to engage one or the other of said clutch discs or to be moved to a neutral position free of engagement with either of said clutch discs, a hydraulic motor operably connected to said movable pressure plate, conduits connecting said motor and pump, and a manually operable control valve mounted on said truck and adapted to be moved to one position to engage said first-named clutch disc and move the vehicle forwardly and to a second position to engage said second-named clutch disc to drive the vehicle in reverse and to a neutral position interrupting fluid flow to said hydraulic motor.

2. In a lift truck having an engine, a fluid coupling and a transmission connected to each other in the sequence named, said transmission including a pressure plate assembly driven by the fluid coupling, said pressure plate assembly including axially spaced annular members and a movable annular member interposed between said spaced annular members, a series of forward drive gears having a clutch disc fixed to one forward drive gear, said clutch disc arranged within said pressure plate assembly between one of said first-named annular members and said movable annular member, a series of reverse drive gears, one of said reverse drive gears being provided with a clutch disc, said reverse drive clutch disc being disposed between the other of said annular members and said movable annular member, said forward and reverse drive gears being intermeshed whereby when said forward drive clutch disc is gripped by said movable annular pressure plate and said forward drive clutch is rotated in the same direction as the engine said reverse drive clutch disc is rotated in an opposite direction, a closed hydraulic system including a pump driven by said engine and a fluid motor operably connected to said movable annular member in said pressure plate assembly and a manually operated valve carried by the vehicle adapted to be moved to one position to cause the pressure plate assembly to grip the forward drive clutch or to a second position to release the forward drive clutch and engage the reverse drive clutch and to a third position interrupting fluid flow to said motor to cause said annular pressure plate member to be moved to a neutral position whereby the pressure plate assembly rotates freely without engaging either of said clutch discs.

3. In a lift truck, an engine, a fluid coupling driven by said engine, a hydraulic gear pump driven by said fluid coupling and a transmission operably connected to said fluid coupling to be driven thereby, said transmission comprising a clutch pressure plate assembly operably connected to said fluid coupling, a forward drive shaft supported in said transmission co-axially with said clutch pressure plate assembly, said drive shaft having a clutch disc on one end thereof disposed within said clutch pressure plate assembly, a reverse drive tube rotatably mounted on said forward drive shaft within said transmission, said reverse drive tube having a clutch disc at one end operable arranged within said clutch pressure plate assembly, a forward drive gear fixed to that end of the forward drive shaft remote from the clutch disc, a reverse drive gear fixed to the end of the reverse drive tube remote from the clutch disc, a common idler gear mounted in the transmission to be driven by either of said first-named gears and in constant mesh therewith whereby when the forward drive clutch is rotated by the clutch pressure plate assembly in the same direction as the engine the reverse drive clutch is rotated in an opposite direction, a closed hydraulic system including said gear pump, a hydraulic cylinder having a piston operably connected to said clutch pressure plate assembly whereby the clutch pressure plate assembly may selectively grip either of said clutch discs or be moved to a neutral position releasing each of said clutch discs.

4. In a lift truck, an engine, a fluid coupling driven by said engine, a hydraulic gear pump driven by said fluid coupling and a transmission operably mounted on said fluid coupling to be driven thereby, said transmission including a clutch pressure plate assembly operably connected to said fluid coupling, a forward drive shaft mounted co-axially with said clutch pressure plate assembly, said drive shaft having a clutch disc on one end thereof embraced by said clutch pressure plate assembly, a reverse drive tube rotatably mounted on said forward drive shaft, said reverse drive tube having a clutch disc at one end embraced by said clutch pressure plate assembly, a forward drive gear fixed to that end of the forward drive shaft remote from its clutch disc, a reverse drive gear fixed to the end of the reverse drive tube remote from its clutch disc, a common idler gear adapted to be driven by either of said first-named gears and in constant mesh therewith whereby when the forward drive clutch is rotated by the clutch pressure plate assembly in the same direction as the engine the reverse drive clutch is rotated in an opposite direction, a closed hydraulic system including said gear pump, a hydraulic cylinder having a piston operably connected to said clutch pressure plate assembly, conduits and a manual valve whereby the clutch pressure plate assembly may selectively rotate either of said clutch discs or be moved to a neutral position free of each of said clutch discs.

5. In a lift truck having an engine, a fluid coupling and a transmission, said transmission including a pressure plate assembly rotated by the fluid coupling, said pressure plate assembly including axially spaced relatively fixed annular members and a movable annular member interposed between said spaced relatively fixed annular members, a series of forward drive gears having a clutch disc, said clutch disc arranged within said pressure plate assembly between one of said first-named annular members and said movable annular member, a series of reverse drive gears having a clutch disc, said reverse drive clutch disc being disposed between the other of said annular members and said movable annular member, said forward and reverse drive gears being intermeshed whereby when said forward drive clutch disc is gripped by said movable annular pressure plate and said forward drive clutch is rotated in one direction, said reverse drive clutch disc is rotated in an opposite direction, a closed hydraulic system including a pump driven by said engine, fluid conduits and a fluid motor operably connected to said movable annular member in said pressure plate assembly and a manually operated valve carried by the vehicle adapted to be moved in one position to cause the pressure plate assembly to grip the forward drive clutch or to a second position to release the forward drive clutch and engage the reverse drive clutch and to a third position interrupting fluid flow to said motor to cause said annular pressure plate member to be moved to a neutral position whereby the pressure plate assembly rotates freely without engaging either of said clutch discs.

6. In a lift truck having an engine, a fluid coupling and a transmission operatively connected in the sequence named, said transmission including forward and reverse gears to establish forward and reverse drive of the truck, a closed hydraulic system including a hydraulic pump driven by said engine, a clutch pressure plate assembly rotated by said fluid coupling, a clutch disc operably connected to said forward drive gears disposed within said clutch pressure plate assembly, a clutch disc operably connected to said reverse driving gears disposed within said clutch pressure plate assembly, a movable pressure plate carried by said pressure plate assembly adapted to be moved to engage one or the other of said clutch discs or to be moved to a neutral position free of engagement with either of said clutch discs, a hydraulic motor operably connected to said movable pressure plate and a manually operable control valve mounted on said truck and adapted to be moved to one position to couple said first-named clutch disc and move the vehicle forwardly and to a second position to couple said second-named clutch disc to drive the vehicle in reverse and to a neutral position interrupting fluid flow to said hydraulic motor.

References Cited in the file of this patent

UNITED STATES PATENTS

| | | |
|---|---|---|
| 843,076 | Detrick | Feb. 5, 1907 |
| 1,928,301 | Pierson | Sept. 26, 1933 |
| 2,280,329 | White | Apr. 21, 1942 |
| 2,301,099 | Upp | Nov. 3, 1942 |
| 2,376,699 | Jandasek | May 22, 1945 |
| 2,456,614 | Banker | Dec. 21, 1948 |
| 2,464,538 | Vanderzle | Mar. 15, 1949 |
| 2,535,300 | LeTourneau | Dec. 26, 1950 |
| 2,550,055 | Flinn | Apr. 24, 1951 |
| 2,658,592 | Polomski | Nov. 10, 1953 |

OTHER REFERENCES

Publication: Automatic Transmissions, Toboldt, Strouse, and Wililiams (1951), pp. 215–225.